United States Patent [19]

Thoma et al.

[11] Patent Number: 5,679,166
[45] Date of Patent: Oct. 21, 1997

[54] MAGNETIC RECORDING MEDIA, MAGNETIC RECORDING MEDIA FABRICATION METHOD, AND FABRICATION EQUIPMENT

[75] Inventors: Kiyokazu Thoma, Hirakata; Kazunari Yoshimoto, Kyoto; Ryuji Sugita, Hirakata; Tatsuaki Ishida, Sakai, all of Japan

[73] Assignee: Matsushita Electric Industrial Co., Ltd., Osaka-fu, Japan

[21] Appl. No.: 542,192

[22] Filed: Oct. 12, 1995

Related U.S. Application Data

[62] Division of Ser. No. 395,818, Feb. 28, 1995, Pat. No. 5,569,523.

[30] Foreign Application Priority Data

Feb. 28, 1994 [JP] Japan .................. 6-029582
Apr. 12, 1994 [JP] Japan .................. 6-073200

[51] Int. Cl.$^6$ .......................................... C23C 16/00
[52] U.S. Cl. ................ 118/719; 118/723 CB; 118/723 EB; 118/726
[58] Field of Search ................. 118/719, 723 CB, 118/723 EB, 726

[56] References Cited

U.S. PATENT DOCUMENTS 4,511,594  4/1985  Yanai et al. .................. 427/38
5,202,149  4/1993  Ishida et al. ................. 427/534
5,418,059  5/1995  Sugita et al. ................. 428/332
5,451,427  9/1995  Takahashi et al. ............ 427/130
5,458,914  10/1995  Tohma et al. ................ 427/132

FOREIGN PATENT DOCUMENTS 62-236122  10/1987  Japan .
3-54719    3/1991   Japan .
3-178028   8/1991   Japan .
06103571   4/1994   Japan .................. G11B 5/85

*Primary Examiner*—Stevan A. Resan
*Attorney, Agent, or Firm*—Wenderoth, Lind & Ponack

[57] ABSTRACT

A magnetic recording medium fabrication device includes a cooling drum around which a substrate runs while being cooled thereby, an ion gun arranged upstream to a vapor deposition station for kicking out particles absorbed on the plane of the substrate, a cooling body arranged between the cooling drum and ion gun for absorbing kicked out particles and a vapor deposition device for depositing a magnetic layer on the substrate at the vapor deposition station. The magnetic particles forming the magnetic layer that have residual magnetization vectors within ±10° of the easy axis direction including the magnetic anisotropy of the medium are greater than or equal to 70% and less than or equal to 90% of the total amount of magnetic particles.

8 Claims, 8 Drawing Sheets

Playback output & Noise (dB)

Thickness of 2nd magnetic layer (μm)

Playback output & Noise (dB)

Amount of oxygen introduce during formation of 2nd magnetic layer (ℓ/min.)

MAGNETIC RECORDING MEDIA, MAGNETIC RECORDING MEDIA FABRICATION METHOD, AND FABRICATION EQUIPMENT

This application is a Divisional of parent application Ser. No. 08/395,818, filed Feb. 28, 1995 now U.S. Pat. No. 5,569,523.

BACKGROUND OF THE INVENTION

1. Field of the Invention

This invention relates to thin-film magnetic recording media of excellent high-density recording characteristics, a method for their manufacture, and the fabrication equipment thereof.

2. Description of the Prior Art

Magnetic recording and playback systems with increasingly high-density recording characteristics have come into being. This has created an increasing demand for magnetic recording media with superior short-wave read/write characteristics. The majority of the magnetic recording media currently in use are coated magnetic recording media which are made by applying a coating of magnetic powder to a substrate. Although improvements have been made to satisfy the demand, efforts to achieve continued improvements have encountered certain limits.

To overcome the limits, thin-film magnetic recording media have been developed. These recording media, which are produced by the vacuum vapor deposition method, the sputtering method, or the plating method, offer excellent short-wave read/write characteristics. For thin-film magnetic recording media, the use of the following magnetic layers is being considered: Co, Co—Ni, Co—Ni—P, Co—O, Co—Ni—O, Co—Fe—O, Co—Ni—Fe—O, Co—Cr, and Co—Ni—Cr.

From the point of view of the suitability of application to magnetic tape, Co—O and Co—Ni—O films, which are partially oxidized films, are considered to be the best. A vapor deposition tape in which Co—Ni—O is used as a magnetic layer has already been commercialized as a Hi8 VCR tape (ME tape). From a production efficiency standpoint, the vacuum vapor deposition method with oblique incidence is used as a method for producing thin-film magnetic recording media.

A detailed explanation of one example of a vapor deposition tape fabrication method follows, with reference to FIG. 12. FIG. 12 shows an example of the internal configuration of the continuous vacuum vapor deposition apparatus for producing vapor deposition tapes by oblique incidence.

Substrate 100, composed of a polymer material, runs in the direction of arrow R along a cylindrical drum 200. Reference numerals 201 and 202, respectively, denote a supply roll and a takeup roll for substrate 100. Reference numeral 203 denotes a free roller, several of which are provided at appropriate locations to ensure that substrate 100 runs evenly. In some cases cylindrical drum 200 is cooled by some cooling media, such as cooling water, in order to prevent thermal damage to the substrate from radiation heat from the evaporation source during the vapor deposition process or from the heat of condensation that occurs when evaporated atoms deposit on the substrate.

The deposition of evaporated atoms, vaporized from evaporation source 120, onto substrate 100 forms a magnetic layer. An electron beam evaporation source is well suited to be evaporation source 120. In this source, an alloy based on cobalt is filled as evaporation substance 130. The reason for the use of an electron beam evaporation source as an evaporation source is to vaporize high-melting-point metals, such as cobalt, at a high rate of evaporation. In the figure, electron beam 110 is depicted schematically in terms of an arrow.

Reference numerals 150 and 151 denote shielding plates that are provided in order to prevent the deposition of superfluous evaporated atoms onto the substrate and to define the range in which evaporated atoms strike substrate 100. A magnetic layer is formed when the evaporated atoms, passing through opening 180 composed of the shielding plate, reach the substrate. The incident angle of evaporated atoms is defined as the angle formed by an incident direction of evaporated atoms and a line normal to substrate 100. Shielding plate 151 defines the initial incident angle $\phi i$. Likewise, shielding plate 150 defines the final incident angle $\phi f$. It should be noted that the initial incident angle $\phi i$ in the fabrication of Hi8 VCR tape ME is approximately 90°, and the final incident angle $\phi f$ is approximately 30°. $\phi i$ is 90° when evaporated atoms are in contact with substrate 100, in which case shielding plate 151 can be omitted.

An oxygen supply nozzle 170 is provided at the edge of shielding plate 150 in order to introduce oxygen into the vacuum tank during vapor deposition. By optimizing the amount of oxygen introduced, vapor deposition tapes of excellent read/write characteristics and practical utility can be obtained.

The magnetic layer of the magnetic recording medium thus fabricated has a columnar structure, and its easy axis is inclined relative to the line normal to the magnetic layer. In other words, the easy axis is neither in the film nor in the direction of the line normal to the film surface. Rather, it is in a direction that is slanted with respect to the normal line on the normal surface, which includes the incident direction of evaporated atoms with respect to the substrate. For example, in commercial Hi8 VCR ME tapes, the easy axis is inclined approximately 20° on the normal surface that includes the lengthwise direction of the tape. Here, the lengthwise direction of a tape is the direction along the length of the tape. In the fabrication equipment shown in FIG. 12, this direction is the direction in which substrate 100 runs. The magnetization that is recorded by a ring-type magnetic head remains in the direction of the obliquely slanted easy axis and forms a magnetization mode different from conventional longitudinal recording.

The formation of such a slanted magnetization mode produces a significant improvement in high-density recording characteristics over conventional longitudinal recording media.

Further, to improve the read/write characteristics and practical utilization characteristics, a double-layer structure magnetic layer has been proposed (Japanese Patent laid-Open Publication H3-54719). As noted above, when a magnetic layer is formed by the oblique vapor deposition method relative to a running substrate, the incident angle varies from an initial incident angle to a final incident angle between the spot where the film formation process is begun and the spot where the film formation process is terminated. As a result, the columnar crystal particles that compose the film are inclined and bend relative to the substrate surface. In a double-structure magnetic layer, the performance characteristics of the magnetic layer can be varied according to the angle of inclination of the columnar crystal particles that compose the magnetic layers.

For example, if the angle of inclination of the columnar crystal particles for a layer is opposite to the direction in which the substrate runs, during read/write, the change in playback output due to a relative moving direction between the ring-type magnetic head and the magnetic layer tends to decrease. Further, it has been proposed to make the film thickness of the lower magnetic layer greater than that of the top magnetic layer in order to reduce the change in playback output (Japanese Patent laid-Open Publication H3-178028).

If the direction of inclination of the columnar crystal particles in the different layers is the same as the running direction of the substrate, the change, during read/write, in playback output due to a relative moving direction between the ring-type magnetic head and the magnetic layer tends to increase. However, in a certain direction, high playback output can be obtained. Further, a proposal has been made to make the oxygen content of the top magnetic layer greater than that of the bottom magnetic layer in order to achieve a better head touch and to improve the tape's durability (Japanese Patent laid-Open Publication S62-236122). Both approaches offer the advantage of decreasing the noise level, as compared to a single-layer magnetic layer, by effecting a double-layer structure.

In both the single- and double-layer structures, the film thickness of the magnetic layer is approximately 0.2 μm.

SUMMARY OF THE INVENTION

An essential object of the present invention is to offer magnetic recording media of excellent high-density recording characteristics, a fabrication method thereof, and fabrication equipment.

The first fact of the present invention, relating to magnetic recording media, is characterized in the use, in the normal surface that includes the direction of tape run, of a ferromagnetic thin-film magnetic layer in which 70% to 90% of the total amount of magnetic particles have a residual magnetization vector within ±10° of the easy axis direction that includes the shape magnetic anisotropy of the medium.

By suppressing the dispersion of the easy axes of magnetic particles, the dispersion of magnetic flux near the magnetic layer surface can be curbed. The resulting stabilization of the magnetization vector, due to the high magnetic anisotropy in an optimized easy axis direction, produces high playback output and low noise. If a ring-type magnetic head is used as a magnetic head, and to ensure the effective action of the magnetic flux from the magnetic layer on the magnetic head, the easy axis direction, including the shape magnetic anisotropy of the medium, must be inclined 65° to 80° preferably 70° to 75°, from the direction normal to the film surface.

The fabrication equipment for the magnetic recording medium of the present invention is a vapor deposition system for producing the magnetic layer for the aforementioned magnetic recording media. The constituent element of this system is characterized in that a cooling drum is provided in a vacuum tank in order to allow the substrate to run along the drum, an ion gun is provided at an upstream position of the aforementioned substrate run to a shielding plate that is provided in order to define an initial incident angle of evaporated atoms relative to the substrate, and, further, a cooling body is provided between the ion gun and the cooling drum.

The fabrication method for the magnetic recording medium of the present invention is designed to produce the magnetic layer for the magnetic recording media using the fabrication equipment for the magnetic recording media. The constituent element of this fabrication method is characterized in that ions from the ion gun are allowed to strike the substrate surface at a maximum acceleration voltage of 400 V, and a thin-film magnetic layer is formed by holding the temperature of the cooling body below that of the cooling drum.

In the above fabrication equipment and fabrication method, the substrate surface is irradiated with low-energy ions having a maximum acceleration voltage of 400 V. This removes any gas that was physically adsorbed on the substrate surface and forms a thin-film by keeping the substrate clean even when a cooling drum is used. This substantially suppresses any dispersion of the easy axes of the magnetic particles due to a decrease in substrate temperature.

The second magnetic recording medium of the present invention is a thin-film magnetic recording medium composed of a magnetic layer whose main constituents are cobalt and oxygen. The constituent element of this magnetic recording medium is characterized in that the film thickness of the magnetic layer is greater than or equal to 0.05 μm and less than or equal to 0.12 μm; the magnetic layer is composed of a first magnetic layer that is formed on the substrate and a second magnetic layer that is formed on the first magnetic layer; the columnar particles that form the first and second magnetic layers are inclined in a substantially same direction; and that the film thickness of the second magnetic layer is greater than or equal to 50%, and less than or equal to 80%, of the total film thickness of the magnetic layers.

In the above constituent element, the minimum film thickness of a magnetic layer can be derived from the tolerance range for playback output; similarly the maximum film thickness of a magnetic layer can be derived from the noise tolerance range. The first layer of the magnetic layers principally has a shape magnetic anisotropy and serves as an under layer. Therefore, it is not necessary that this layer has a large film thickness. On the other hand, the second of the magnetic layers is the principal magnetic layer. It has a large magnetocrystalline anisotropy due to the effects of the first magnetic layer, which is an under layer, and due to the particular fabrication method employed, as will be detailed later. In the second magnetic layer, which is the principal magnetic layer, the greater the film thickness is, the better is the read/write characteristics in this short-wave region. To ensure favorable read/write characteristics, the layer film thickness of the magnetic layer should be greater than or equal to 0.06 μm and less than or equal to 0.1 μm, and the film thickness of the second magnetic layer should be greater than or equal to 60% and less than or equal to 75% of the total film thickness of the magnetic layers.

The method for the fabrication of the second magnetic recording medium of the present invention involves vapor deposition on a substrate that runs along the contact surface of a cylindrical drum. It is a method for the fabrication of the aforementioned second magnetic recording medium. The constituent element of this method is characterized in that, during a sequential formation of first and second magnetic layers and if an angle formed by a line normal to the substrate and an incident direction of evaporated atoms is defined as the incident angle, the incident angle at the beginning stage of the formation of the aforementioned first and second magnetic layers is greater than the incident angle at the end of the formation process, the incident angle at the end of the formation of the first magnetic layer is greater than the incident angle at the end of the formation of the second magnetic layer, and the ratio of (amount of introduced oxygen)/(rate of film deposition) during the formation of the first magnetic layer is greater than the ratio of (amount of introduced oxygen)/(rate of film deposition) during the formation of the second magnetic layer.

A large incident angle and a large ratio of (amount of introduced oxygen)/(rate of film deposition) ensure that the resultant first magnetic layer is a film that has a large shape magnetic anisotropy and excellent under layer properties. The second magnetic layer, formed on the first magnetic layer, is a film endowed with a large magnetocrystalline anisotropy.

The fabrication equipment for the second magnetic recording medium of the present invention is designed to achieve high production efficiency for the fabrication of the second magnetic recording medium according to the aforementioned fabrication method for the second magnetic recording medium. Its constituent element is characterized in that first and second evaporation sources are provided along the substrate running direction on a cylindrical drum, such that these sources are located on the upstream side of the substrate running direction relative to the perpendicular straight line that passes through the center of the cylindrical drum; a shielding plate having both first and second openings corresponding to the respective evaporation sources is placed between the first and second evaporation sources on the one hand and the cylindrical drum on the other; the distance between the perpendicular straight line passing through the center of the cylindrical drum and the center of the evaporation unit of the first evaporation source is greater than the radius of the cylindrical drum; the distance between the perpendicular straight line passing through the center of the cylindrical drum and the center of the evaporation unit of the second evaporation source is less than the radius of the cylindrical drum; and that the first evaporation source is located at a position higher than the horizontal position of the second opening.

Because this method is capable of forming a double-layer structure magnetic layer in a single substrate run, it can achieve a high productivity. Because the first magnetic recording medium need not be thick, only a small first evaporation source is used. Further, the positioning of the first evaporation source so that it does not impede gas evacuation from the second opening ensures the production of high-performance magnetic layers.

BRIEF DESCRIPTION OF THE DRAWINGS

The present invention will become more fully understood from the detailed description given below and the accompanying drawings wherein.

DESCRIPTION OF PREFERRED EMBODIMENTS

A detailed description of the present invention is given below with reference to the drawings.

Figure 1:
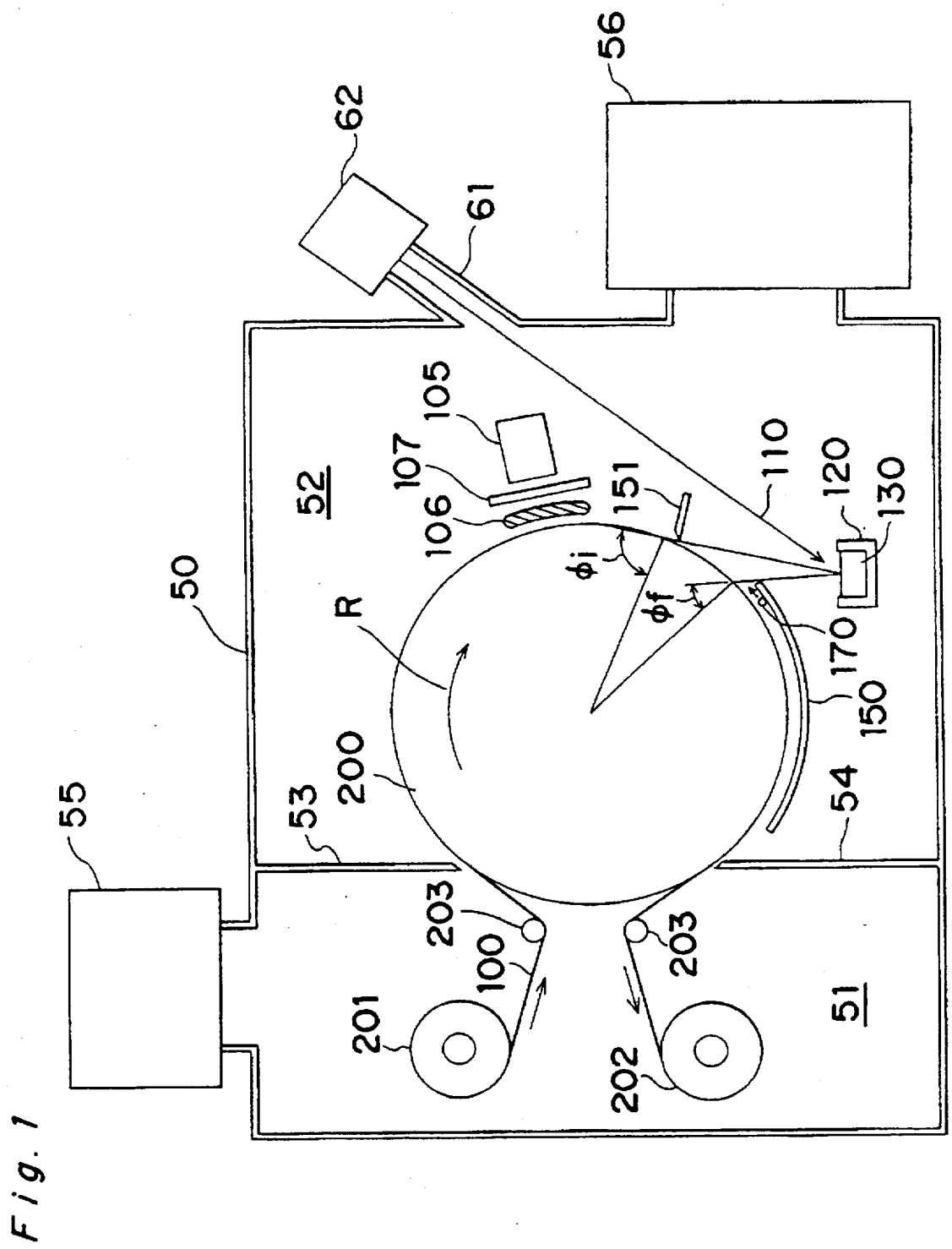
FIG. 1 is a cross-sectional view showing a schematic internal structure of the vapor deposition equipment which is used in the fabrication method for the first magnetic recording medium of the present invention.

FIG. 1 is a cross-sectional view showing a schematic internal structure of the vapor deposition equipment which is used in the fabrication method for the first magnetic recording medium of the present invention.

As shown in FIG. 1, a vacuum tank 50 is divided into a subchamber 51 of a relatively small volume and a main chamber 52 of a relatively large volume with two partition wall 53 and 54 forming an aperture therebetween. These chambers 51 and 52 are evacuated by vacuum pumps 55 and 56, respectively.

In subchamber 51, a supply roll 201 for supplying a film substrate 100, made of a polymer material and a takeup roll 202 for winding up a magnetic tape having a magnetic layer formed on the substrate 100.

In main chamber 52, a cylindrical drum 200 is rotatably housed and, upon forming the magnetic layer, is rotated around the center axis thereof in a direction of arrow R at a constant speed by a suitable driving mechanism (not shown). A beam guide 61 is formed on a sidewall of tank 50 on the side of main chamber 52 which extends upwardly and obliquely and an electron gun 62 is mounted on the upper end of beam guide 61. Electron gun 62 generates an electron beam 110 directed to an evaporation source 120 arranged at the bottom side of main chamber 52.

Figure 12:
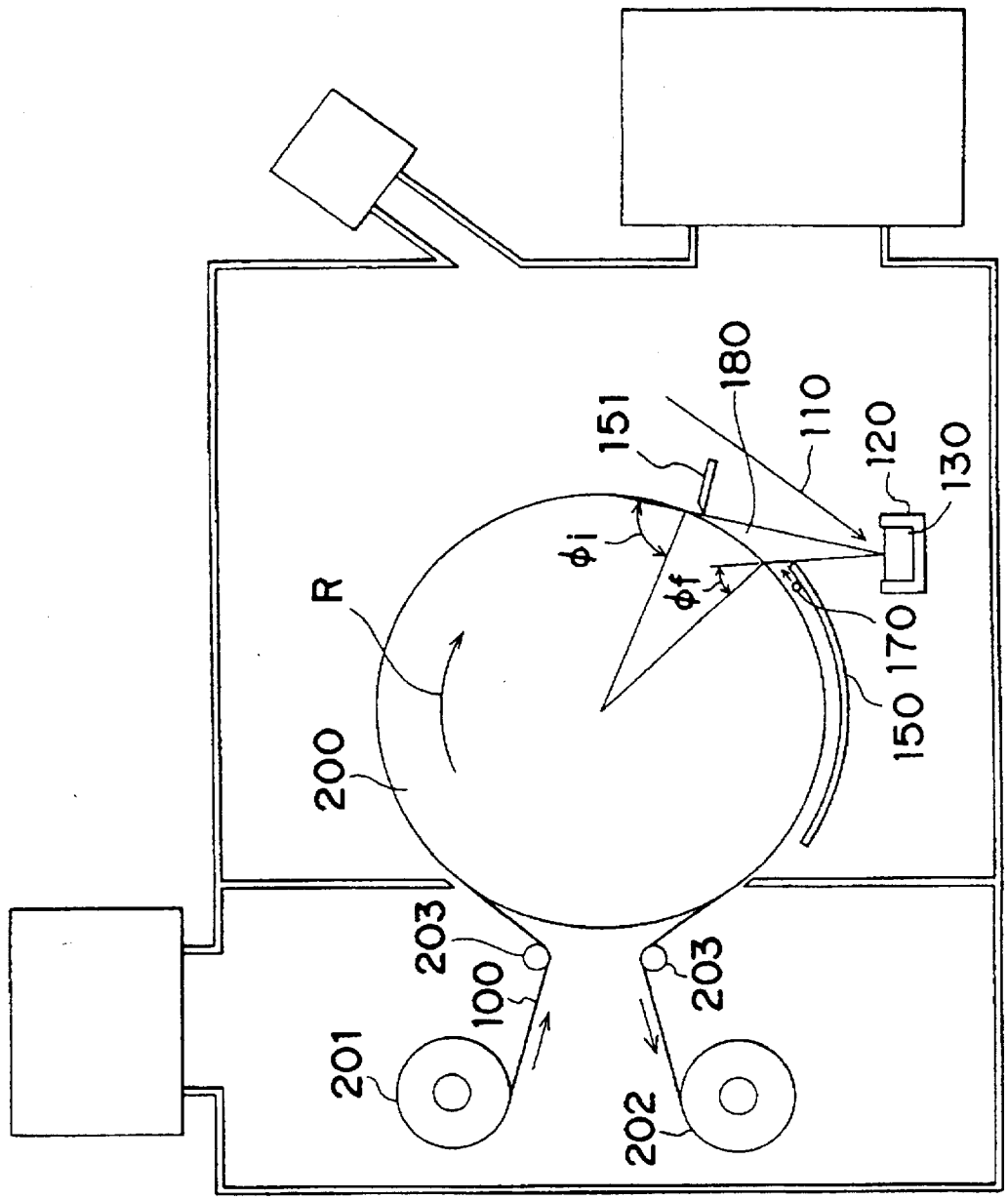
FIG. 12 is a cross-sectional view showing a schematic view of the internal structure of the conventional magnetic recording medium fabrication equipment.

In FIG. 1, substrate 100 composed of a polymer material runs in the direction of arrow R along the contact surface of cylindrical drum 200. A thin-film is formed by the deposition of evaporated atoms on substrate 100. Reference numeral 170 denotes an oxygen supply nozzle. Shielding plates 150 and 151 define the incident angle of evaporated atoms. Cylindrical drum 200 uses a cooling drum that performs cooling by means of a cooling medium, as will be explained later. These components of FIG. 1 are largely similar to those in FIG. 12 depicting conventional equipment. The difference between fabrication equipment for the first magnetic recording medium of the present invention and conventional equipment lies in ion gun 105 and cooling body 106 that are provided above shielding plate 151 on the upstream side of the path along which the substrate runs.

The following is an explanation of ion gun 105 and cooling body 106.

Figure 2:
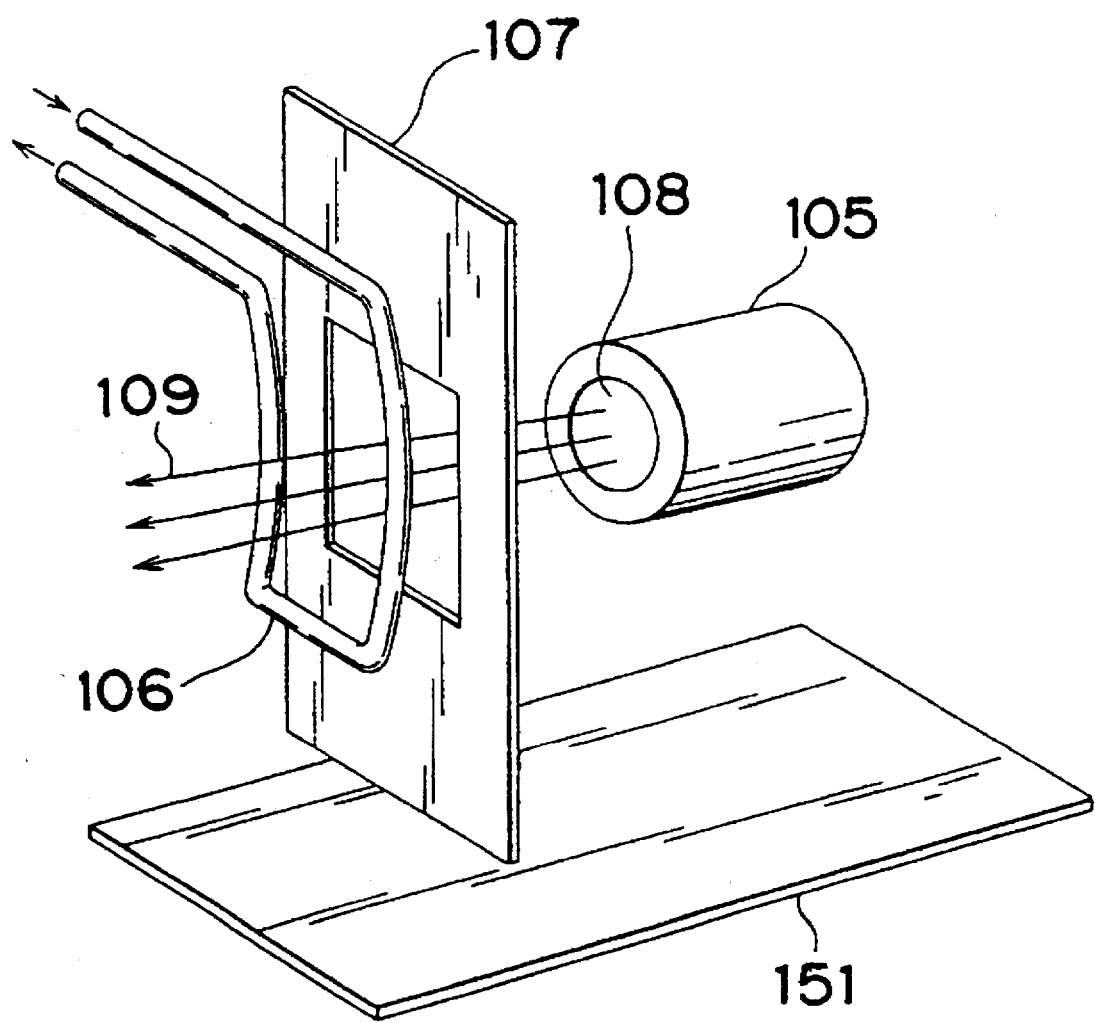
FIG. 2 is a perspective view showing the positional relationship between the ion gun and the cooling body in the fabrication equipment for the first magnetic recording medium of the present invention.

FIG. 2 is an enlarged perspective view for showing the positional relationship between shielding plate 151, ion gun 105 and cooling body 106. Ion gun 105 is similar to that which is used in ion-beam sputtering, ion milling, or in the pretreatment of substrates. Grid 108 of ion gun 105 emits accelerated ions 109, such as argon, nitrogen, hydrogen, and oxygen. Typically Argon is used. To prevent ions 109 from striking cooling body 106, a shielding plate 107 is provided between ion gun 105 and cooling body 106. When cylindrical drum 200 is cooled, the out-gas, whose main constituent is water, which is produced from the various components of the equipment during vapor deposition, tends to be adsorbed avidly by substrate 100. Therefore, the adsorbed gas is knocked off by the impact of ions 109 from ion gun 105 before a thin-film is formed on substrate 100. An excessively high ionic energy during this process degrades substrate 100. Although not stated in the body of this text, an electron gun is used in some cases to affix substrate 100 onto cylindrical drum 200 to prevent the heat degradation of substrate 100. An excessively high ionic energy of ions 109 produced by ion gun 105 during this process neutralizes electrons emitted by the electron gun, thus diminishing the electron gun's ability to affix the substrate. The main purpose of ion gun 105 here is not to improve the surface quality of substrate 100, but to remove the gas that was physically adsorbed on the substrate surface. Therefore, it is not necessary that the ions be accelerated to a high energy. For these reasons, the acceleration voltage of ions should be less than or equal to 400 V. The gas that was knocked off is adsorbed onto cooling body 106 that is cooled to a temperature less than the temperature of cylindrical drum 200, thus preventing any re-adsorption of the gas onto substrate 100. Cooling body 106 can be cooled by any method. A method that is favored because of convenience is to construct cooling body 106 as a pipe-shaped object through which a cooling medium is allowed to circulate, as indicated in FIG. 2. To increase the surface area, the pipe-shaped object can be provided with grills and plates. Such a feature is also desirable from the standpoint of increasing the efficiency with which the gas is adsorbed. Further, in some cases ion gun 105 is provided with a neutralizer (not shown in the figure), in addition to grid 108 for accelerating ions. The neutralizer is a wire, composed of tungsten and other substances, through which a current is passed in order to generate hot electrons. The electrons neutralize the positive charge buildup that is produced by the ionic bombardment.

Thus, even when a cooling drum is used, a thin-film can be formed in a condition in which substrate 100 is maintained in a clean state. In this manner, the present invention can effectively implement the suppression of the dispersion in the easy axes of magnetic particles that would otherwise occur when the substrate temperature is reduced.

Figure 3:
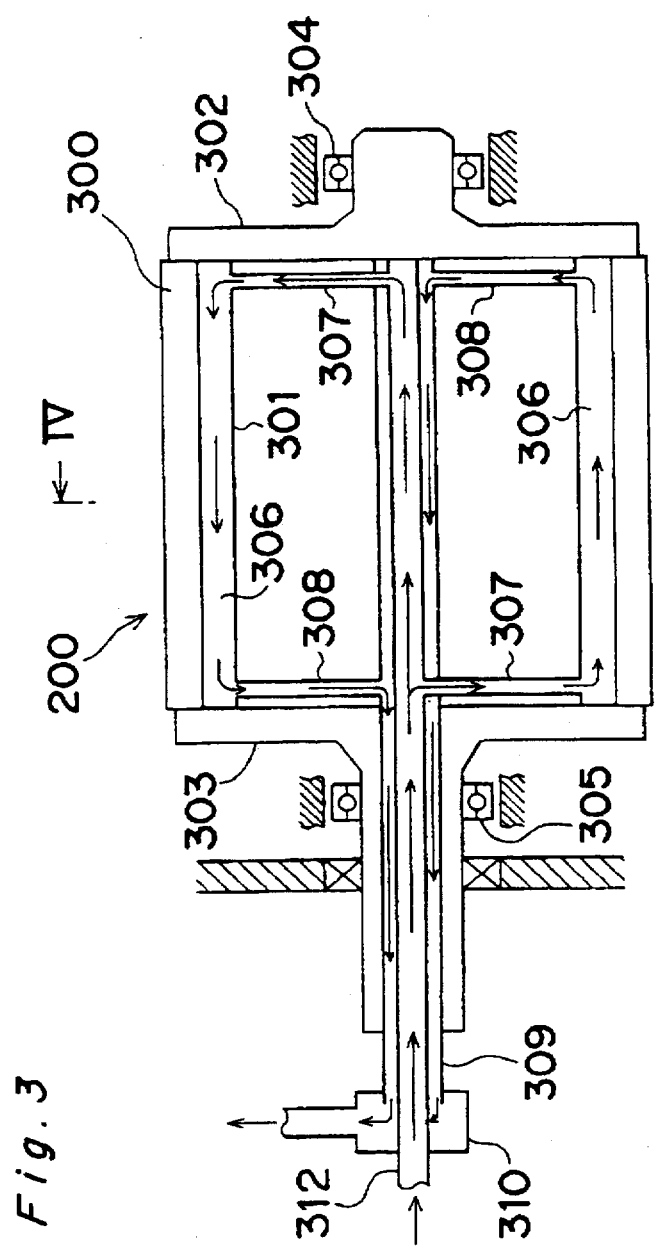
FIG. 3 is a cross-sectional view of a cooling drum shown in FIG. 1.

As shown in FIG. 3, cooling drum 200 is formed as a double cylinder comprising an outer shell 300 and an inner shell 301. Space between outer shell 300 and inner shell 301 is radially partitioned by a plurality of partition walls 311 as shown in FIG. 4.

Axial parts of end plates 302 and 303 are rotatably supported by bearing means 304 and 305, respectively. Coolant is supplied from an inner central conduit 312 and distributed to each partitioned conduit between outer shell 300 and inner shell 301 through each radial inlet tube 307. Coolant supplied at one end of each partitioned conduit 306 flows in an axial direction of the drum 200 and is collected through each radial outlet tube 308 to an outer central conduit 309. Then, coolant collected is discharged through a rotary joint 310 to recycle it.

Figure 4:
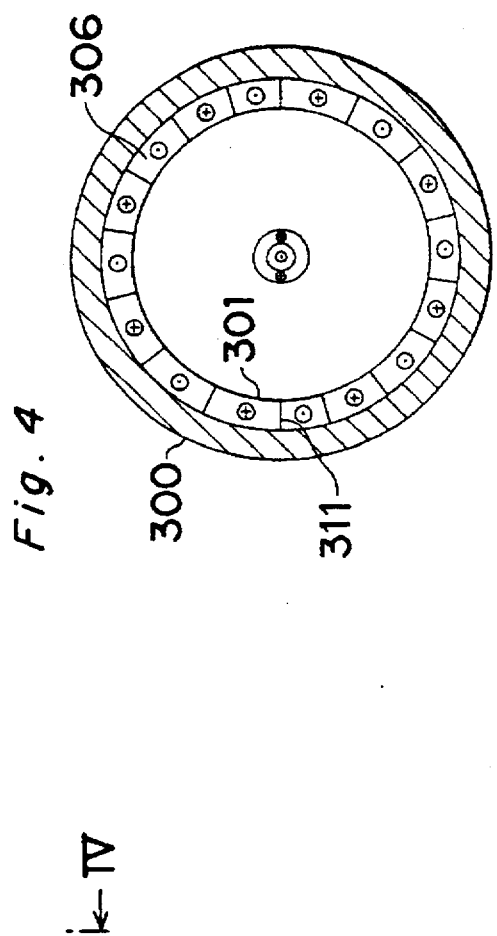
FIG. 4 is a cross-sectional view along line IV—IV of FIG. 3.

As indicated in FIG. 4, flow directions of adjacent partitioned conduits 306 are set opposite to each other.

By this coolant circulation system, the surface of cooling drum 200 is held at a homogeneous constant temperature.

Figure 5:
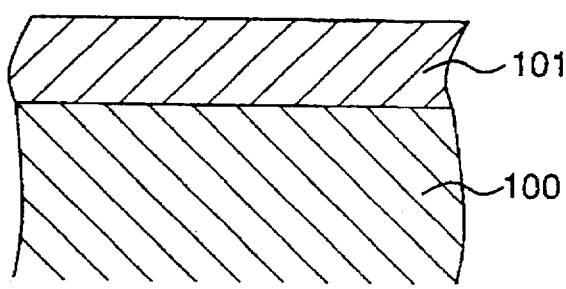
FIG. 5 is a cross-sectional view showing a schematic view of the first magnetic recording medium in an embodiment of the present invention.

FIG. 5 is a cross-sectional view showing a schematic view of the first magnetic recording medium in an embodiment of the present invention. The magnetic recording medium shown in this figure comprises substrate 100 and a magnetic layer 101 that is provided on the substrate. Although magnetic layer 101 is depicted as a single layer in this embodiment, it can also be a multi-layer structure.

Substrate 100 is made of a polyethylene terephthalate film, a polyimide film, a polyamide film, a polyether film, a polyethylene naphthalate film, and other polymer films, or a polymer film that contains an under layer.

The following explains the formation of a Co—O thin-film as a magnetic layer in use of the conventional vacuum vapor deposition equipment shown in FIG. 12.

A magnetic layer of Co—O was formed, and a thin-film magnetic recording tape was produced continuously on substrate 100 by vaporizing cobalt from evaporation material 130 that was heated by an electron gun and by introducing oxygen gas into a vacuum chamber from oxygen supply nozzle 170. In this embodiment, a polyethylene terephthalate film was used as substrate 100. The running speed of this film was regulated so as to produce a magnetic layer film thickness of 80 nm. Vapor deposition was conducted by introducing oxygen from oxygen supply nozzle 170 at a rate of 1 liter per minute with an internal pressure inside the equipment of $6.7 \times 10^{-3}$ Pa. The temperature of cylindrical drum 200 supporting substrate 100 was maintained at 40° C. The initial incident angle $\phi i$ used during the vapor deposition was 80° in all cases, whereas the final incident angle $\phi f$ was allowed to vary. Table 1 shows the conditions under which the magnetic layer was formed.

TABLE 1

| Sample | $\phi_i$ | $\phi_f$ | Drum temp. |
|---|---|---|---|
| 1-1 | 80° | 70° | 40° C. |
| 1-2 | 80° | 65° | 40° C. |
| 1-3 | 80° | 60° | 40° C. |
| 1-4 | 80° | 55° | 40° C. |
| 1-5 | 80° | 50° | 40° C. |

The following explains the formation of a Co—O thin-film as a magnetic layer in use of the magnetic recording medium fabrication equipment of the present invention shown in FIG. 1.

A magnetic layer of Co—O was formed, and a thin-film magnetic recording tape was produced continuously on substrate 100 by vaporizing cobalt from evaporation material 130 that was heated by an electron gun and by introducing oxygen gas into a vacuum chamber from-oxygen supply nozzle 170. In this embodiment, a polyethylene terephthalate film was used as substrate 100. The running speed of this film was regulated so as to produce a magnetic layer film thickness of 80 nm. The initial incident angle $\phi i$ used during the vapor deposition was 80°, whereas the final incident angle $\phi f$ was 60°. Both cylindrical drum 200 and cooling body 106 were cooled using a cooling medium, and their temperatures were regulated. The amount of oxygen required decreased as cylindrical drum 200 was cooled. When the drum temperature was −20° C., the amount of oxygen introduced was 0.6 liter per minute and the pressure inside the equipment was $5.0 \times 10^{-3}$ Pa. Argon was introduced into ion gun 105 at a flow rate of 10 cc/min. Although the ionic current density used in this embodiment was 20 mA/cm$^2$, the density can be regulated appropriately according to the running speed of substrate 100. Table 2 shows the conditions under which the magnetic layer was formed.

TABLE 2

| Sample | φ_i | φ_f | Drum temp. | Cooling body temp. | Acceleration voltage |
|---|---|---|---|---|---|
| 2-1 | 80° | 60° | 20° C. | — | — |
| 2-2 | 80° | 60° | 0° C. | — | — |
| 2-3 | 80° | 60° | −20° C. | — | — |
| 2-4 | 80° | 60° | −20° C. | −100° C. | — |
| 2-5 | 80° | 60° | −20° C. | — | 300 V |
| 2-6 | 80° | 60° | −20° C. | −100° C. | 300 V |
| 2-7 | 80° | 60° | −20° C. | −100° C. | 400 V |
| 2-8 | 80° | 60° | −20° C. | −100° C. | 500 V |
| 2-9 | 80° | 60° | −20° C. | −50° C. | 300 V |
| 2-10 | 80° | 60° | 0° C. | −50° C. | 300 V |

The distribution of residual magnetization vectors, the magnetic anisotropy, and the read/write characteristics of the magnetic layer thus produced were evaluated.

The following is an explanation of the residual magnetization vector distribution measurement method that was used to determine quantitatively the dispersion of the easy axes of the magnetic layer.

Normally, magnetization vectors are oriented in the direction of easy axes. In the case of a thin-film, a magnetic anisotropy exists in plane of the film that tends to force the magnetization vectors to orient themselves toward the in-plane of the thin-film. The easy axis that is determined solely by the magnetic anisotropy in the plane, naturally, occurs in the plane. The origin of the in-plane magnetic anisotropy is a shape magnetic anisotropy that originates from a macro shape that is a thin-film. On the other hand, a magnetic anisotropy also exists that originates from the magnetic anisotropy of the magnetic particles that comprise the thin-film. The easy axis, i.e., intrinsic easy axis, behaves as a function of the shape of the magnetic particles, their orientation, their alignment, the crystallinity of the particles, and the crystalline orientation of the thin-film as an aggregate of the particles. If the direction of the latter magnetic anisotropy lies between the in-plane direction and the direction of the line normal to the film, i.e., if an oblique magnetic anisotropy exists, the easy axis including the shape anisotropy of the thin-film lies between the direction of the intrinsic easy axis and the in-plane direction. The easy axis that includes the shape magnetic anisotropy of the thin-film is called the apparent easy axis of the thin-film. The magnetization vector in a thin-film is stabilized in the direction of the easy axis that includes the thin-film shape magnetic anisotropy.

Therefore, for a quantitative determination of the dispersion of easy axes, it suffices to determine the distribution of residual magnetization vectors.

Figure 6A:
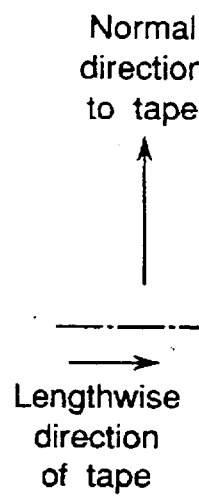
FIG. 6A shows the distribution of residual magnetization vectors that result when a magnetic field is applied along the length of a tape.
Figure 6B:
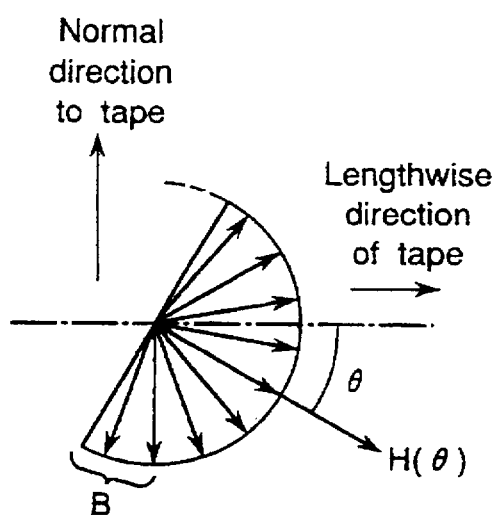
FIG. 6B shows the distribution of residual magnetization vectors that result when a magnetic field is applied at an angle θ from the direction along the length of a tape.

The distribution of residual magnetization vectors can easily be measured using a vibrating sample magnetometer according to the following procedures:

First, a magnetic field H(0) is applied on the film, in the direction in which the substrate runs, in order to saturate the magnetic layer. After that, the magnetic field is removed. FIG. 6A shows the resulting distribution of residual magnetization vectors in the plane of the film, where the residual magnetization in the lengthwise direction of the tape is denoted as Mr(0). Then, a magnetic field H(θ) is applied on the film in a plane that is perpendicular to the width direction of the tape in a direction which is slightly shifted by an infinitesimally small angle θ from the lengthwise direction of the tape. After that, the magnetic field is removed and residual magnetization Mr(θ) in the lengthwise direction of the tape is measured. FIG. 6B shows the resulting distribution of residual magnetization vectors. In this figure, the magnetization vector that occurred in item A in FIG. 6A has reversed to B in FIG. 6B after the magnetic field H(θ) is applied. It should be noted that, except for A, the residual magnetization vectors undergo no changes. Therefore, the difference between Mr(0) and Mr(θ) is equal to the difference between the lengthwise-direction component of the magnetization vector A and the lengthwise-direction component of the magnetization vector B. This relationship is indicated by Equation 1. In Equation 1, V denotes the volume of the magnetic particles that exists in A, and Ms denotes the saturation magnetization. From Equation 1, volume V of the magnetic particles existing in A can be determined.

By performing this measurement repeatedly, it is possible to determine the volume of the magnetic particles that have magnetization vectors in various directions and to determine the distribution of magnetization vectors. From the resulting distribution curve, volume ratio f of the magnetic particles having magnetization vectors within ±10° of easy axis β was determined. This value was used as a measure that indicates the degree of orientation of the easy axes. Specifically, the greater the volume ratio f, the higher is the degree of orientation of easy axes and the smaller is their dispersion. Incidentally, measurements taken of commercial ME tape indicated a volume ratio f of 62%.

$$M_r(0) - M_r(\theta) = 2 \int_0^\theta M_s V \cos\theta d\theta \quad \text{Equation 1}$$

In order to determine the magnetic anisotropy of the magnetic layer, the direction β of the easy axis, including the shape magnetic anisotropy of the thin-film and magnetic anisotropy field $H_K^*$ in direction β, were evaluated using a torque magnetometer according to the measurement method described in IEEE Trans. on Magn 27 (1991) pp. 4864–4866.

The read/write characteristics of the magnetic layer were measured using an off-the-shelf 8-mm VCR unit. The playback output (C) and the noise (N) were evaluated at a 7 MHz recording frequency.

The results of these evaluations are shown in Tables 3 and 4. β is the angle between the easy axis and the film normal.

TABLE 3

| Sample | φ_f | β | f | $H_K^*$ | C | N |
|---|---|---|---|---|---|---|
| 1-1 | 70° | 73° | 85% | 1180 kA/m | +3.7 dB | −1.3 dB |
| 1-2 | 65° | 70° | 80% | 1125 kA/m | +3.2 dB | −1.1 dB |
| 1-3 | 60° | 67° | 73% | 1040 kA/m | +2.2 dB | −0.8 dB |
| 1-4 | 55° | 65° | 71% | 1010 kA/m | +1.9 dB | −0.6 dB |
| 1-5 | 50° | 63° | 65% | 825 kA/m | 0.0 dB | 0.0 dB |

TABLE 4

| Sample | Drum temp. | Cooling body temp. | Acceleration voltage | f | $H_k^*$ | C | N |
|---|---|---|---|---|---|---|---|
| 1-1 | 40° C. | — | — | 85% | 1180 kA/m | 0.0 dB | 0.0 dB |
| 2-1 | 20° C. | — | — | 75% | 1065 kA/m | -1.2 dB | +0.4 dB |
| 2-2 | 0° C. | — | — | 77% | 1080 kA/m | -0.9 dB | +0.3 dB |
| 2-3 | -20° C. | — | — | 78% | 1100 kA/m | -0.8 dB | +0.2 dB |
| 2-4 | -20° C. | -100° C. | — | 79% | 1115 kA/m | -0.7 dB | +0.2 dB |
| 2-5 | -20° C. | — | 300 V | 79% | 1120 kA/m | -0.6 dB | +0.2 dB |
| 2-6 | -20° C. | -100° C. | 300 V | 88% | 1190 kA/m | +0.5 dB | -0.2 dB |
| 2-7 | -20° C. | -100° C. | 400 V | 90% | 1200 kA/m | +0.8 dB | -0.3 dB |
| 2-8 | -20° C. | -100° C. | 500 V | — | — | — | — |
| 2-9 | -20° C. | -50° C. | 300 V | 83% | 1155 kA/m | -0.2 dB | 0.0 dB |
| 2-10 | 0° C. | -50° C. | 300 V | 81% | 1125 kA/m | -0.4 dB | +0.1 dB |

Table 3 indicates that as final incident angle φf becomes smaller, volume ratio f decreases, and magnetic anisotropy field $H_K^*$ also decreases. Specifically, there is a significant decrease in the property when φf decreases from 55° to 50°. Apparently this phenomenon is caused by a rapid increase in film thickness due to the formation of film at a low incident angle. The read/write characteristic also declines as final incident angle φf decreases in an apparent reflection of the aforementioned volume ratio and the value of the magnetic anisotropy field. These results suggest that the desirable value of f is 70% or greater, preferably 80% or greater. Similarly, the desirable value of β is 65° or greater, and that of $H_K^*$ is 1000 kA/m or greater. A film for which the value of β was greater than 80° was produced under film formation conditions of an initial incident angle φi of 90° and a final incident angle φf of greater than or equal to 80°. However, the resulting productivity was extremely low, and the resulting film was extremely weak, and not suitable as a magnetic recording medium. Therefore, the desirable range of β is from 65° to 80°, inclusively.

The following is an description of the results shown in Table 4.

Samples 2-1, 2-2, and 2-3 were formed by varying the temperature of the cylindrical drum. The lower the temperature, the better were the read/write characteristics, apparently due to an increase in the shape magnetic anisotropy due to the self-shadowing effect as the substrate temperature, i.e., the temperature of the cylindrical drum, decreased during film formation.

Samples 2-3, 2-4, 2-5, and 2-6 were produced in order to investigate the effects of a cooling body as well as the effects of ion bombardment. When only a cooling body was used (2-4) or only ion bombardment was conducted (2-5), only a few effects were observed compared to the sample (2-3) which was produced without the use of a cooling body and without receiving any ion bombardment. The effect, however, was noticeable in the sample (2-6) which received both. This effect is thought to be due to the knocking off of the gas adsorbed on the substrate surface by ion bombardment and the efficient capture of the released gas by the cooling body. Thus, the effect may reflect the fact that vapor deposition occurred in a clean condition on the surface of the substrate which was maintained at a low temperature. It can be inferred that keeping the substrate surface clean enhances the crystallinity of the film, thus increasing the contribution from the magnetocrystalline anisotropy, and that reducing the substrate temperature simultaneously achieved an increase in the shape magnetic anisotropy.

Samples 2-6, 2-7, and 2-8 were formed by varying the ionic acceleration voltage during ion bombardment. The sample (2-7) produced by setting the acceleration voltage at 400 V exhibited the best read/write characteristics of the samples in this embodiment. The sample (2-8), produced by setting the acceleration voltage at 500 V, however, exhibited a degradation of, and damage to, the substrate because of too high an ionic energy. This hampered the evaluation of read/write characteristics. Therefore, for stable achievement of the effects of the present invention, the ion acceleration voltage should be set at 400 V or less.

Samples 2-6 and 2-9 were produced by varying the temperature of the cooling body. Although both samples exhibited the effects of the present invention, the lower the temperature of the cooling body, the better were the results. The desirable temperature seems to be -100° C. or lower.

A comparison of samples 2-2 and 2-10 indicates that the effects of the present invention can be achieved even at a -50° C. cooling body temperature as long as ion bombardment is conducted.

There is a correlation between the volume ratio f of the samples produced under the aforementioned conditions, the magnetic anisotropy field result Hk*, their values, and the read/write characteristics. Therefore, the incident angle was increased in order to obtain an f value greater than 90% or an Hk*, value greater than 1200 kA/m. However, the result produced an extremely decreased film strength, making the resulting film unsuitable as a magnetic recording medium.

Read/write characteristics, equal to, or even surpassing those shown in Table 3 and produced using a high incident angle, were achieved even at a low incident angle when ion bombardment was carried out by providing cooling bodies. This demonstrates that, by using the fabrication method of the present invention, magnetic recording media with excellent read/write characteristics can be obtained at a high production efficiency.

Although cobalt was used in this embodiment as a material for evaporation source 120, metals such as Fe and Ni, or alloys such as Co—Cr and Co—Ni, can also be used. This invention is also effective in a vapor deposition method in which no oxygen is introduced during vapor deposition.

The following is an explanation of the second magnetic recording medium, its fabrication method, and fabrication equipment.

Figure 7:
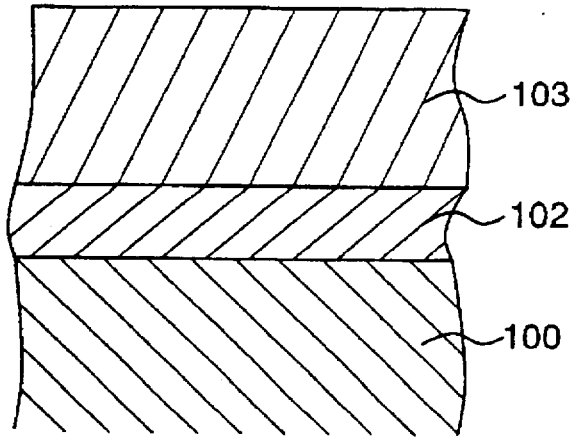
FIG. 7 is a cross-sectional view showing a schematic view of the structure of the second magnetic recording medium of the present invention.

FIG. 7 shows a schematic cross-sectional view of the magnetic layer of the second magnetic recording medium of the present invention. There is a first magnetic layer 102 on substrate 100. A second magnetic layer 103 is on first magnetic layer 102. Thus, the magnetic layer of the magnetic recording medium comprises two stacked magnetic layers.

The principal components of the magnetic material are cobalt and oxygen. Cobalt is the best-suited thin-film magnetic layer because it is endowed with a high saturation magnetization and a high magnetocrystalline anisotropy energy. The combination of cobalt and oxygen serves to enhance the properties of cobalt to the maximum extent.

To increase the energy of the magnetic layer due to the shape magnetic anisotropy, the present invention employs a method consisting of two points: the first point involves the alignment of the direction of inclination of the columnar particles in first magnetic layer 102 and second magnetic layer 103. The second point involves making the columnar particles as straight as possible. As can be seen in the fabrication method which will be described later, a cylindrical drum is ill-suited to making columnar particles straight. When a cylindrical drum is used, columnar particles curve. An important requirement is to make the curve as small as possible. The curvature should be less than 15°. Further, given that a ring-type magnetic head is used for read/write purposes, the inclination of columnar particles, in order to fully utilize the shape magnetic anisotropy of columnar particles, should be greater than or equal to 20° and less than or equal to 35° from the substrate surface.

In order to increase the energy of the magnetic layer due to magnetocrystalline anisotropy, in departure from the prior art (Japanese Patent laid-Open Publication H3-178028), the present invention uses a configuration in which first magnetic layer 102 is made thin and the second magnetic layer thick. Direct formation of a magnetic layer on substrate 100, as in this invention, often fails to produce a high crystallinity. The reason for this condition appears to be that the various impurities, including gases, that occur in the neighborhood of the polymer surface inhibit crystalline growth. If the film is made thick, the crystallinity increases due to the preferred growth characteristic of crystals at the expense of an increased crystal granularity and an increase in noise.

Therefore, in the present invention, first magnetic layer 102 is considered, crystallographically, to be the under layer for second magnetic layer 103, which is formed at the next step; and the two layers are stacked in such a way that the first magnetic layer is the thinner of the two layers. However, although first magnetic layer 102 contributes little as a magnetic layer from a magnetocrystalline anisotropy standpoint, because it possesses a shape magnetic anisotropy, it can naturally function as a magnetic layer. Since second magnetic layer 103 is formed on first magnetic layer 103, which is the under layer, it can produce a relatively high crystallinity even at the initial stages of film formation. Thus, second magnetic layer 103 exhibits excellent magnetic layer properties, offering both a high magnetocrystalline anisotropy and a high shape magnetic anisotropy. If the magnetocrystalline anisotropy is strong, however, the direction of its easy axis may not agree with the direction of columnar particles. In the present invention, the incident angle used and the amount of oxygen introduced are adjusted within an allowable range during the formation of the two magnetic layers so that the two directions agree, i.e., the magnetic anisotropy energy of the magnetic layers increases. In view of the fact that a ring-type magnetic head may be used for read/write, the easy axis direction of the magnetic layer should be adjusted so that it is greater than or equal to 65° and less than or equal to 80° from the line normal to the film. It should be noted that in the present context, the term "direction of easy axis" encompasses the shape magnetic anisotropy of the thin-film. The so-called intrinsic easy axis direction, from which the influence of the shape of the thin-film has been eliminated, is a direction higher from the substrate surface than the easy axis direction in the present context. If the easy axis direction of a magnetic layer is greater than 80° from the line normal to the film, an increase in noise results, apparently due to the formation of a zigzag magnetic wall due to the collision of magnetizations. Conversely, if the easy axis direction of a magnetic layer is less than 65° from the line normal to the film, a small perpendicular component of the recording magnetic field in the ring-type magnetic head reduces the recording efficiency, and produces reduced playback output and an increased spacing loss factor.

An explanation of the thickness of a magnetic layer follows. For first magnetic layer 102 to be able to function as a under layer for second magnetic layer 103, its thickness must be at least 0.01 μm, approximately. A thickness greater than approximately 0.6 μm causes an increase in granularity, as a result of the increased film thickness, and leads to an increased noise level. Therefore, the optimal film thickness of first magnetic layer 102 is greater than or equal to 0.01 μm and less than or equal to 0.6 μm. Further, the optimal range of the total thickness of the magnetic layer in which both first magnetic layer 102 and second magnetic layer 103 are combined is between 0.5 μm and 0.12 μm. A total magnetic layer thickness of less than or equal to approximately 0.05 μm results in a precipitous decrease in the playback output in the long-wave region as well as in the short-wave region with an attendant difficulty in tracking adjustment. On the other hand, a total thickness greater than or equal to approximately 0.12 μm causes an increase in noise with a reduced C/N ratio. The optimum thickness ratio between magnetic layers and the optimum total thickness varies with the type of head used depending on the write performance of the head and the coercive force of the magnetic layer. In the film thickness range for the aforementioned magnetic layer of the present invention, the coercive force of the first magnetic layer tends to rise with an increase in film thickness, whereas the coercive force of the second magnetic layer tends to increase as the film thickness decreases. Therefore, in the case of a ferrite ring head, in which the saturation magnetization is small and the gap length is large, the total thickness of the magnetic layers should be large and the film thickness ratio for the second magnetic layer should be increased in order to set the coercive force for the entire magnetic layer low. In the case of a metal ring head, in which the saturation magnetization is large and the gap length small the total thickness of the magnetic layers should be small and the film thickness ratio for the second magnetic layer should be reduced in order to set the coercive force for the entire magnetic layer high.

The following is a description of the method of fabrication of magnetic recording media of the present invention with reference to FIG. 12. Since FIG. 12 was already referred to in the description of a conventional example, a description of the elements of the figure is omitted.

As stated above, the method for the fabrication of magnetic layers, as well as their constitution, has a large bearing on the production of a high magnetic anisotropy energy. In particular, the incident angle of evaporated atoms with respect to the substrate and the amount of oxygen that is introduced are especially important. The magnetic layer of the present invention can be obtained using the equipment of FIG. 12 by setting various conditions and by repeatedly conducting vapor deposition. It should be noted, however, that after a first magnetic layer is formed, the takeup roll should be rewound once before a second magnetic layer can be formed.

An explanation of incident angles follows. An incident angle is defined as the angle formed by the line normal to the substrate and the incident direction of evaporated atoms.

For the formation of either a first magnetic layer or a second magnetic layer, the initial incident angle φi should be made larger than the final incident angle φf for two reasons. The first reason concerns the mechanical strength of the film. A final incident angle φf that is larger than the initial incident angle φi results in a low density on the film surface, i.e., the surface of the magnetic layer. A large incident angle produces a large self-shadowing effect with an attendant decrease in density. A low density translates into a reduced mechanical strength, and an inadequate mechanical strength leads to a greater propensity of the magnetic layer surface to become scratched, which is undesirable. The second reason concerns crystal growth. The c-axis, which is the easy axis direction for cobalt, normally grows perpendicularly with respect to the substrate, and crystal that grow subsequently have the property that they grow in such a way that their crystalline axes are aligned. If the c-axis is to be inclined, the incident angle must be increased. However, an increase in the incident angle increases the dispersion of the c-axis. And, even though the extent of dispersion is large, the slope of the c-axis thus formed is inherited by other c-axes even when the incident angle changes subsequently. Therefore, in order to cause an inclination in the easy axis direction, the initial incident angle must be increased.

The incident angle for the first magnetic layer should be larger than that for the second magnetic layer. The final incident angle φf should be made especially large. The reason is that, although the incident angle is not important if the first magnetic layer is considered to be strictly an under layer, the incident angle should be increased in order to sufficiently induce the shape magnetic anisotropy, if it is considered to be a magnetic layer. Further, since the first magnetic layer is not exposed to the surface of the medium, it need not be mechanically strong. The initial incident angles φi for the two magnetic layers should be either equal or the initial incident angle for the first magnetic layer should be larger than that for the second magnetic layer. At any rate, however, these angles should be less than or equal to 85°, because at an initial incident angle larger than 85°, the dispersion of the c-axis increases greatly. The region for which the incident angle is greater than or equal to 85° is one in which the loci of evaporated atoms form a tangent to the contact surface of cylindrical drum 200 if the evaporated atoms are assumed to advance in a straight line. It is also an area in which the attachment effect approaches 0 percent. If, however, evaporated atoms advance while colliding with each other or with a residual gas, the form in which evaporated atoms deposit on the substrate is likely to be unstable. In the present invention, an incident angle greater than or equal to 85° is not used in order to produce a high-performance magnetic layer with adequate control. In order to ensure that the slope of columnar particles is less than or equal to 35° from the substrate surface, the final incident angle φf must be greater than or equal to 50°. Although the 50° final incident angle may appear inadequate from the aforementioned results (Table 3), it is an appropriate range for a double-layer structure magnetic layer in which the thickness per layer is small.

The amount of oxygen introduced during magnetic layer formation determines the saturation magnetization for the magnetic layer, and it is an important factor for the formation of a magnetic layer. Generally, the greater the saturation magnetization, the higher is the playback output. However, a high playback output by itself is not beneficial. Since the saturation magnetization is an important factor that determines the easy axis direction for the magnetic layer, there is an optimum saturation magnetization. The larger the saturation magnetization, the more closely the easy axis direction approaches the in-plane direction of the magnetic layer. Because of this fact, too large a saturation magnetization leads to an increase in noise. On the other hand, a small saturation magnetization results in a small anisotropy energy for the magnetic layer, which is undesirable. It is important that the range of slope of the columnar particles forming the magnetic layer be adjusted from 20° to 35° by means of incident angles and the range of the easy axis direction be adjusted from 65° to 80° from the film normal line by adjusting the amount of oxygen introduced. It should be noted, however, that the optimum amount of oxygen introduced varies with the equipment configuration, the size of the equipment, the residual gas pressure inside the equipment, and the gas evacuation capability of the equipment. Therefore, it is difficult to represent the optimal amount of oxygen introduced uniquely in terms of specific numerical values. Therefore, the optimum amount of oxygen introduced should be determined on a case-by-case basis according to the type of equipment used.

For the fabrication of the second magnetic recording medium of the present invention, it is necessary that the ratio of (amount of introduced oxygen)/(rate of film deposition) during the formation of the first magnetic layer be greater than the ratio of (amount of introduced oxygen)/(rate of film deposition) during the formation of the second magnetic layer. In terms of saturation magnetization, the saturation magnetization of the first magnetic layer must be smaller than that of the second magnetic layer. In this regard, the present invention differs from the prior example (Japanese Patent laid-Open Publication S62-236122). The first magnetic layer functions as an under layer for the second magnetic layer and also as a magnetic layer in its own right. Whether the first magnetic layer is considered to be an under layer or a magnetic layer, the amount of oxygen introduced is important. The larger the amount of oxygen contained, the higher is the functionality of the first magnetic layer as an under layer. As noted above, the importance of the first magnetic layer lies in the shape magnetic anisotropy of columnar particles. Therefore, the amount of oxygen introduced is important when the first magnetic layer is viewed as a magnetic layer rather than an under layer. Therefore, the function of the first magnetic layer as a magnetic layer has priority over the function of the first magnetic layer as an under layer. The first magnetic layer should be formed at a high incident angle, which produces a high degree of the self-shadowing effect. During the formation of this layer, oxygen must be introduced in order to promote the magnetic separation between columnar particles. Therefore, the ratio of (amount of introduced oxygen)/(rate of film deposition) for the first magnetic layer should be made larger than that for the second magnetic layer, with a consequent reduction in saturation magnetization. Oxygen, however, should not be introduced to an extent that it renders the first magnetic layer nonmagnetic. In the second magnetic layer, on the other hand, the shape magnetic anisotropy of columnar particles as well as the magnetocrystalline anisotropy make large contributions. As a general rule, introducing a gas lowers the crystallinity. Therefore, for the formation of the second magnetic layer, priority should be given to minimizing the extent of decline in crystallinity, and the amount of oxygen introduced should be held to a minimum in order to ensure the minimum necessary magnetic separation of columnar particles. Thus, the ratio of (amount of introduced oxygen)/(rate of film deposition) must be made as small as possible. During actual formation of a magnetic layer, the absolute amount of oxygen that is introduced can be higher for the formation of the second magnetic layer than for the formation of the first magnetic layer depending on the power of the electron beam that is directed at the evaporation source and the conditions such as the range of incident angles. In some cases the converse is true.

Figure 8:
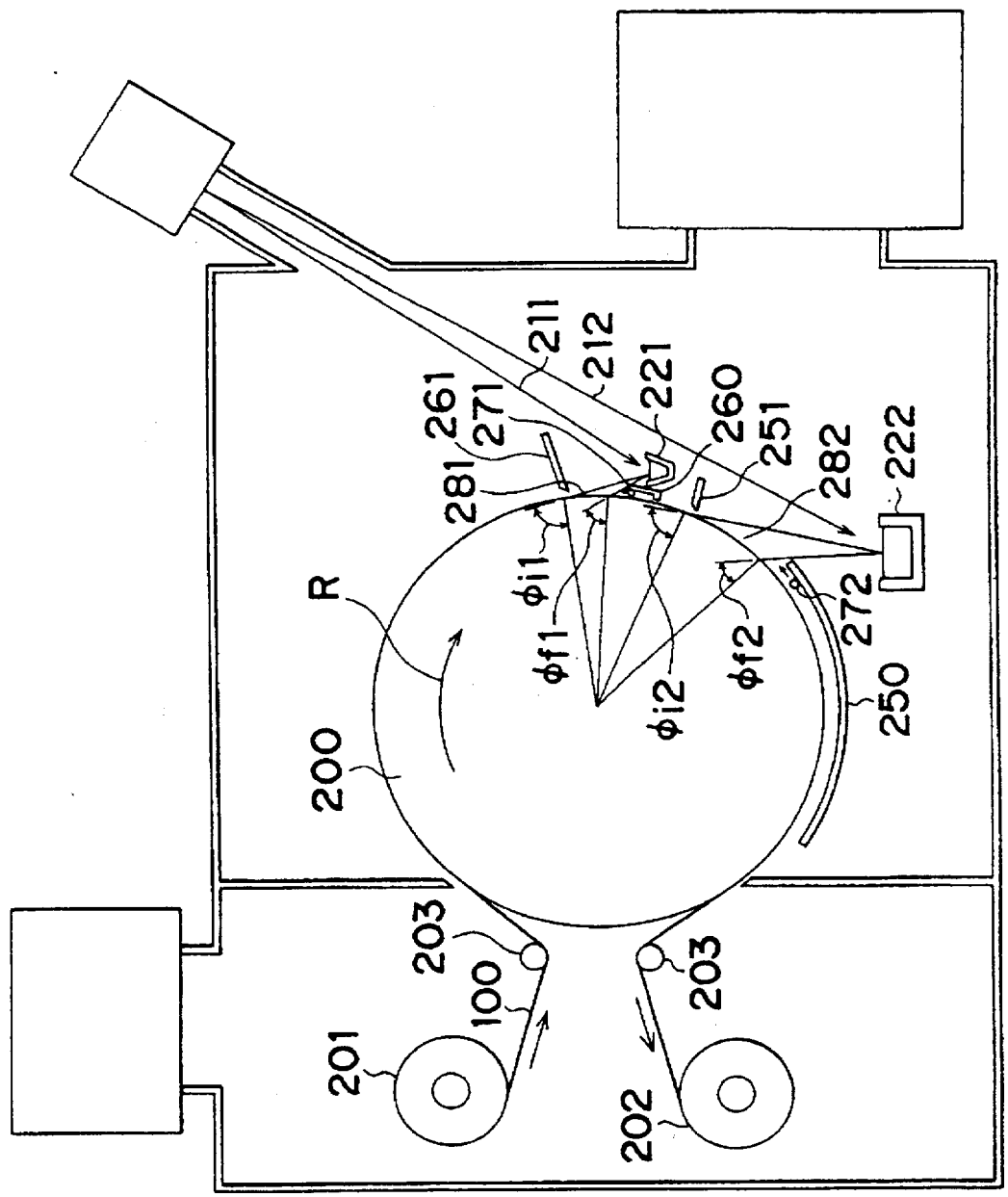
FIG. 8 is a cross-sectional view showing a schematic view of the internal structure of the fabrication equipment for the second magnetic recording medium of the present invention.

The following paragraphs explain the fabrication equipment for the second magnetic recording medium of the present invention with reference to FIG. 8. The equipment shown in FIG. 8 is capable of producing the second magnetic recording medium of the present invention with a single run of the substrate, thus substantially improving productivity.

In FIG. 8, two evaporation sources, 221 and 222, are provided along the running direction of substrate 100 on a cylindrical drum 200. First evaporation source 221 is for the first magnetic layer, and second evaporation source 222, for the second magnetic layer. Shielding plates 261 and 260, and 251 and 250, that provide first and second openings, 281 and 282 corresponding to the respective evaporation sources, are placed between the first and second evaporation sources, 221 and 222, and cylindrical drum 200. At first opening 281 for the first magnetic layer, shielding plate 261 defines the initial incident angle $\phi i1$ for the first magnetic layer. Similarly, shielding plate 260 defines the final incident angle $\phi f1$ for the first magnetic layer. Likewise, at second opening 282 for the second magnetic layer, shielding plate 251 defines the initial incident angle $\phi i2$ for the second magnetic layer. Similarly, shielding plate 250 defines the final incident angle $\phi f2$ for the second magnetic layer. Further, the first and second evaporation sources, 221 and 222, are provided on the upstream side of the direction in which substrate 100 runs relative to the perpendicular straight line that passes through the center of cylindrical drum 200, such that the distance between the perpendicular straight line passing through the center of cylindrical drum 200 and the center of the evaporation unit of first evaporation source 221 is greater than the radius of cylindrical drum 200; the distance between the perpendicular straight line passing through the center of cylindrical drum 200 and the center of the evaporation unit of second evaporation source 222 is less than the radius of cylindrical drum 200; and first evaporation source 221 is located at a position higher than the horizontal position of second opening 282.

In a process that forms the two magnetic layers simultaneously using the above equipment configuration of the present invention, all parameters, other than the running speed of substrate 100, can be controlled independently. Another significant feature of the present invention is its ability to maintain a low pressure for the residual gas in the neighborhood of the vapor deposition unit, which is an important consideration in the vapor deposition method. If, for example, first evaporation source 221 is lower than the horizontal position of second opening 282, first evaporation source 221 blocks the evacuation of residual gas from the neighborhood of second opening 282. If another shielding plate is installed in order to prevent the evaporated atoms from first evaporation source 221 from reaching the second opening, this shielding plate, too, will block the evacuation of residual gas from the neighborhood of second opening 282.

Electron-beam heating using a Pierce electron gun is suited as an electron beam source for mass production purposes. However, installing a plurality of such electron guns will necessitate an increase in equipment size, and the effect of the inert gas that is introduced for converging the electron beams will be considerable, thus leading to an increase in the pressure of the residual gas in the neighborhood of an opening. Therefore, for the purpose of reducing the pressure of residual gas and the size of the equipment, the desirable approach is to direct the electron beam from one electron beam source to two evaporation sources by magnetic field deflection. In this case, the amount of electron beam power that is applied to a evaporation source can be regulated by controlling the proportion in which the electron beam is distributed into the two evaporation sources.

When two evaporation sources are heated using electron beams 211 and 212, measures should be taken so that the electron beam directed to a evaporation source does not intersect the evaporated atom stream flowing from the other evaporation source to an opening. In FIG. 8, for example, if the first evaporation source were located at a position beyond electron beam 212, and away from cylindrical drum 200, electron beam 212 would intersect the evaporated atom stream flowing from first evaporation source 221 to opening 281. Such an arrangement would result in a decrease in productivity, would require extra shielding plates, and therefore would be highly undesirable.

First evaporation source 221 should be smaller than second evaporation source 222. By constructing a small first evaporation source 221 and letting it approach cylindrical drum 200, it is possible to direct electron beam 212 at second evaporation source 222 at a sharper angle, thus enhancing both productivity and ease of control. The crucial point in this equipment configuration is the fact that the first magnetic layer is thin and the second magnetic layer thick, which is a structural characteristic of the magnetic layers of the magnetic recording medium of the present invention. Evaporation source 221 for the first magnetic layer is situated exterior to the lower part of cylindrical drum 200 and forms a structure which is incapable of furnishing the highest possible vapor density to the film formation process. However, because this evaporation source is located close to cylindrical drum 200, the resulting rate of film deposition is substantially high, well within the realm of practical use. Therefore, the evaporation source for the first magnetic layer can be smaller than that for the second magnetic layer and requires only a smaller power for the electron beam. Thus, despite incorporating two evaporation sources, the equipment can be extremely compact.

Each of the two evaporation sources is provided with a set of openings, and each opening is provided with an oxygen supply nozzle. Oxygen is introduced from oxygen supply nozzle 271, which is provided for the first magnetic layer between shielding plate 260 and cylindrical drum 200. Similarly, oxygen is introduced from oxygen supply nozzle 272, which is provided for in the second magnetic layer between shielding plate 250 and cylindrical drum 200. It is important to suppress the inflow of the oxygen introduced from oxygen supply nozzle 271, which is provided for the first magnetic layer, into second opening 282. To this end, measures should be taken such as conferring a key shape on the edge of shielding plate 260.

A description of the present invention with reference to specific embodiments follows.

A Co—O film was formed as a magnetic layer using the magnetic recording medium fabrication equipment shown in FIG. 12. A polyethylene terephthalate film 7 μm thick was used as substrate 100. The cylindrical drum used, reference numeral 200, had a 1.5 m diameter.

(Embodiment 1)

A first magnetic layer was formed with an incident angle range of 80° to 60°. Cobalt was loaded on evaporation source 120 and melted using a 50 kW electron beam.

Oxygen was introduced from oxygen supply nozzle 170 at a rate of 0.9 liter per minute. A film with a thickness of 0.005 μm to 0.2 μm was formed by varying the running speed of substrate 100. After the first magnetic layer was formed, the roll that was taken up was rewound once. On the first magnetic layer thus formed, a second magnetic layer was formed with an incident angle range of 70° to 50°. Cobalt was loaded on evaporation source 120 and melted using a 60 kW electron beam. Oxygen was introduced from oxygen supply nozzle 170 at a rate of 1.0 liter per minute. A film with a thickness of 0.06 μm was formed by adjusting the running speed of substrate 100.

The sample thus prepared was slit into a tape, and its read/write characteristics were examined. The read/write characteristics were measured using a ring-type magnetic head composed of Sendust and with a 0.15 μm gap length. Playback output was determined as a value produced at a recording wavelength of 0.4 μm. The noise was determined as a noise which is 1 MHz lower than the frequency of the recording signal when a signal with a recording wavelength of 0.4 μm is recorded. The results are shown in FIG. 9.

Figure 9:
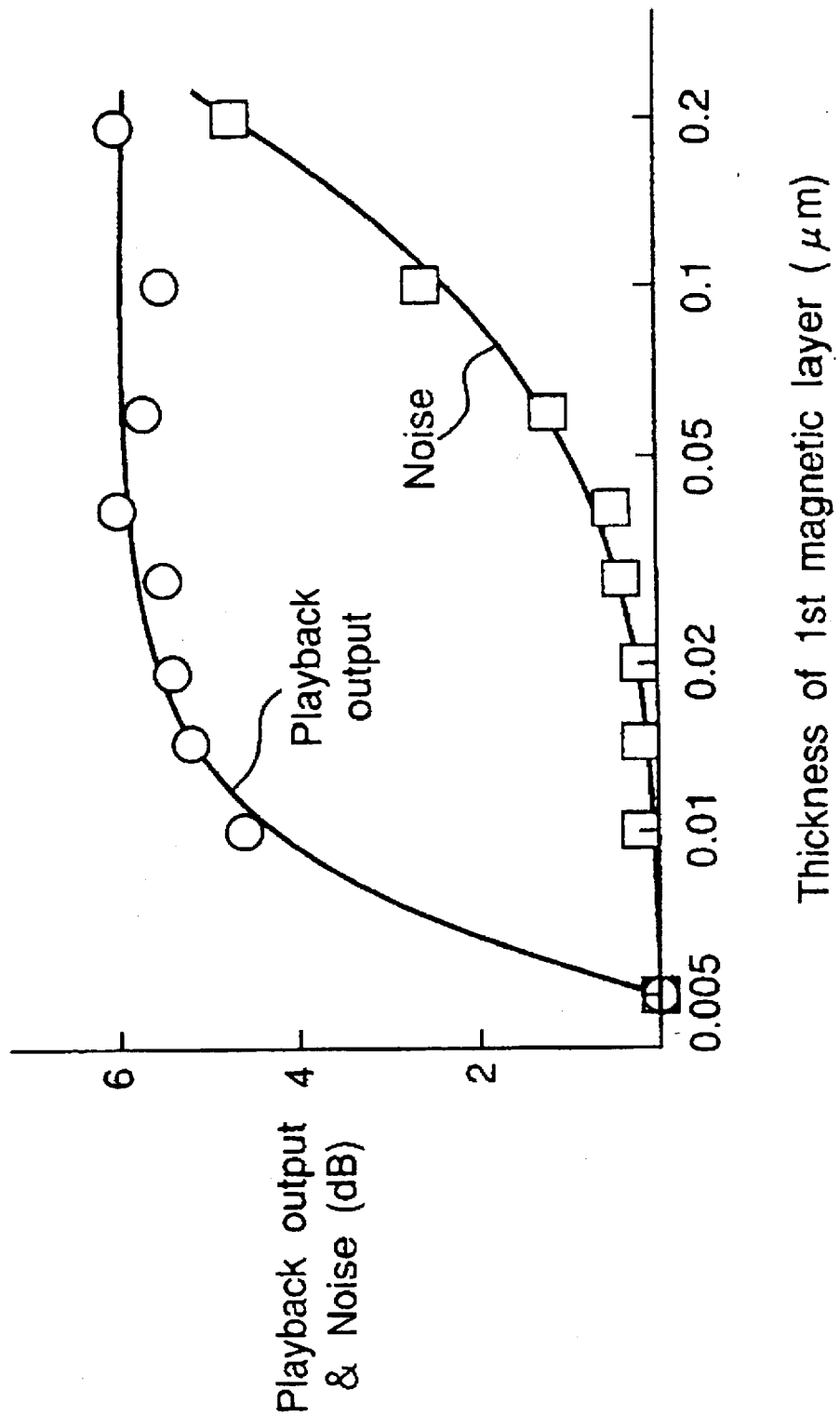
FIG. 9 shows the playback output and noise as a function of the film thickness of the first magnetic layer.

FIG. 9 shows the dependency of the playback output and the noise on the thickness of the first magnetic layer. As the thickness of the first magnetic layer increases, the playback output increases and reaches the saturation point. This phenomenon appears to be attributable to an increase in the functionality of the first magnetic layer as an under layer with an increase in film thickness. At a film thickness of 0.01 μm or greater, it appears that the functionality becomes sufficiently pronounced to be detectable. The noise also increases with an increase in the thickness of the first magnetic layer. At a film thickness of 0.06 μm or greater, the noise increases rapidly, suggesting the manifestation of the influence of an increase in the granularity of columnar particles. This trend remains the same even if the thickness of the second magnetic layer is changed. It should be noted, however, that the absolute value of noise increases with an increase in the thickness of the second magnetic layer. FIG. 9 indicates the optimum range of film thickness for the first magnetic layer.

(Embodiment 2)

A magnetic layer was formed by the same method as in Embodiment 1. The running speed of substrate 100 was adjusted in order to form a film with a 0.02 μm thickness as the first magnetic layer. A second magnetic layer with a thickness of 0.02 μm to 0.2 μm was formed by varying the running speed of substrate 100. The sample, prepared in the same manner as in Embodiment 1, was slit into a tape, and its read/write characteristics were examined. The results are shown in FIG. 10.

Figure 10:
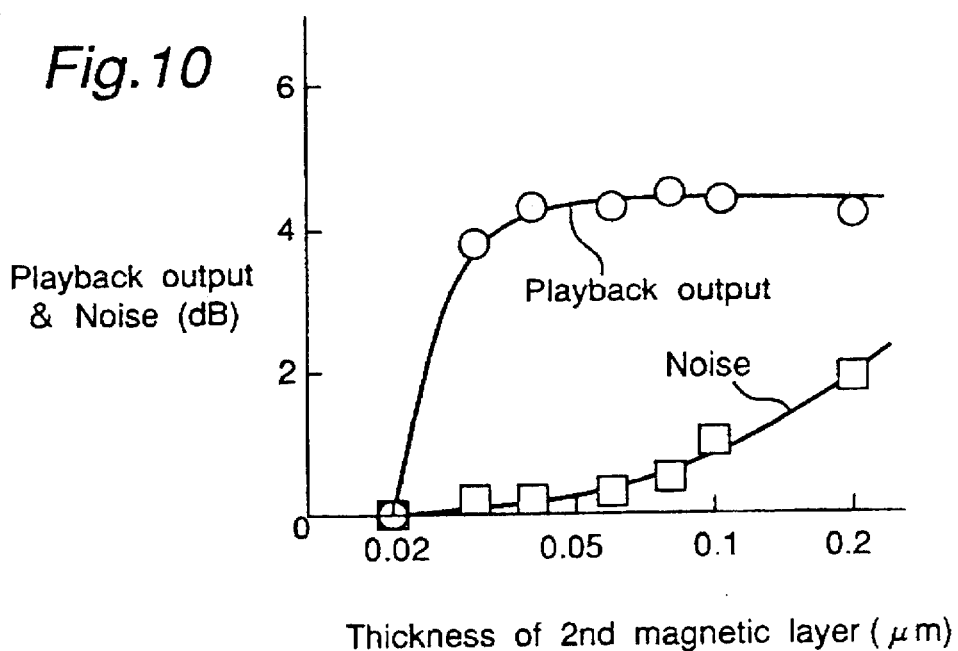
FIG. 10 shows the playback output and noise as a function of the film thickness of the second magnetic layer.

FIG. 10 shows the dependency of the playback output and the noise on the thickness of the second magnetic layer. As the thickness of the second magnetic layer increases, the playback output increases and reaches the saturation point. This indicates that a minimum total thickness of 0.5 μm is required for the magnetic layers. The noise also increases with an increase in the thickness of the second magnetic layer. At a film thickness of 0.1 μm or greater, the noise increases rapidly, suggesting the manifestation of the influence of an increase in the granularity of columnar particles. This trend remains the same even if the thickness of the first magnetic layer is changed. It should be noted, however, that the absolute value of noise increases with an increase in thickness of the first magnetic layer, and the thickness of the second magnetic layer at which noise increases rapidly, shifts toward the smaller thickness region. The reason for this phenomenon may be that the grain-size of the columnar particles in the second magnetic layer inherits the grain size of the columnar particles in the first magnetic layer to some extent. Specifically, reducing the noise requires that the second magnetic layer be slim to compensate for the thickness of the first magnetic layer, and if the first magnetic layer is slim, the noise level can be kept at a minimum even if the thickness of the second magnetic layer is increased to some extent.

A systematic evaluation of the results of Embodiments 1 and 2 indicates that the most favorable conditions are a total film thickness range of 0.05 μm to 0.12 μm for the magnetic layers, in which the thickness of the second magnetic layer is greater than or equal to 50% and less than or equal to 80% of the total thickness. Further, from the standpoint of playback output and the C/N ratio, the desirable conditions are a total film thickness range of 0.06 μm to 0.1 μm for the magnetic layers, in which the thickness of the second magnetic layer is greater than or equal to 60% and less than or equal to 75% of the total thickness.

(Embodiment 3)

A magnetic layer was formed by the same method as in Embodiment 1. The running speed of substrate 100 was adjusted in order to form a film with a 0.03 μm thickness as the first magnetic layer. A second magnetic layer with a thickness of 0.07 μm was formed by adjusting the running speed of substrate 100. The amount of oxygen introduced during the formation of the second magnetic layer was varied. The sample, prepared in the same manner as in Embodiment 1, was slit into a tape and its read/write characteristics were examined. The results are shown in FIG. 11.

Figure 11:
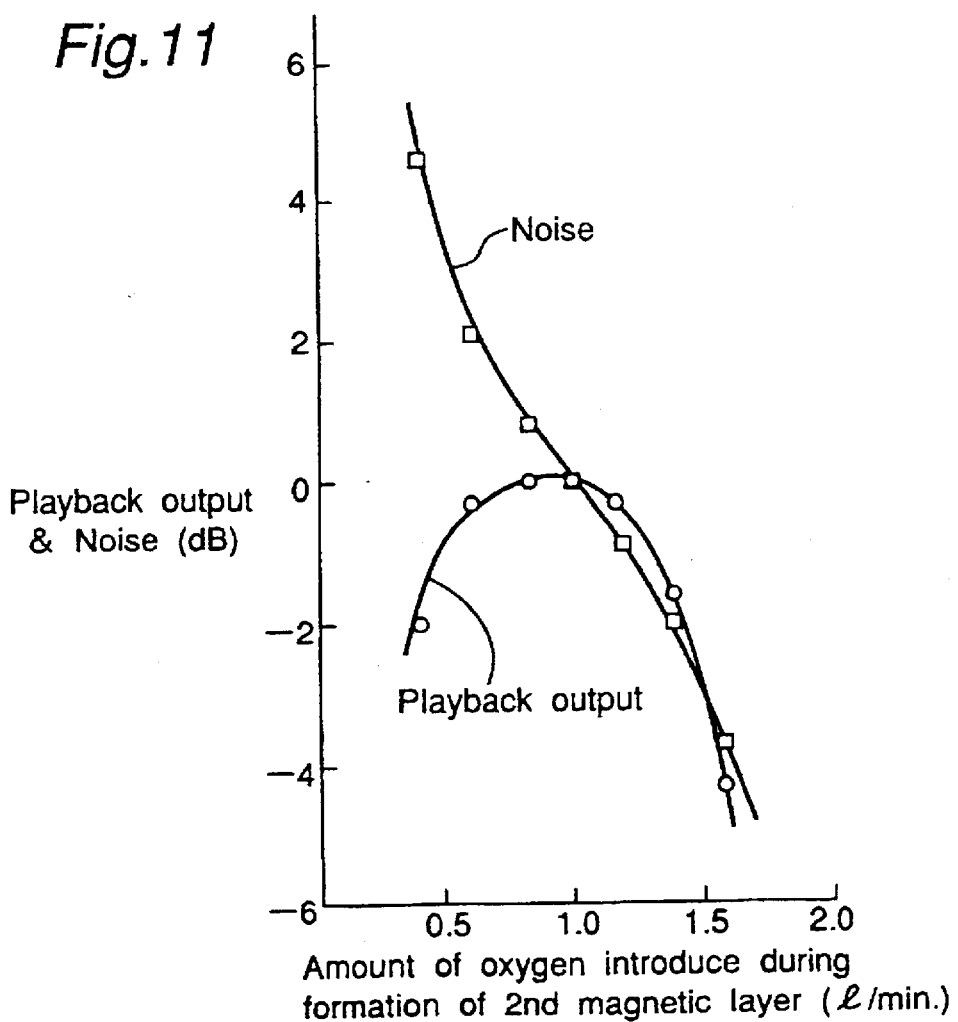
FIG. 11 shows the playback output and noise as a function of the amount of oxygen introduced during the formation of the second magnetic layer.

FIG. 11 shows the dependency of the playback output and the noise on the amount of oxygen introduced during the formation of the second magnetic layer. The figure indicates the existence of an optimum value of the amount of oxygen introduced relative to playback output. An oxygen amount greater than the optimum value precipitously reduces playback output, apparently due to a significant decrease in the crystallinity of columnar particles due to excess oxygen. Noise, on the other hand, decreases monotonically with an increase in the amount of oxygen introduced. The reason for this phenomenon may lie in a decrease in saturation magnetization with an increase in the amount of oxygen introduced and a promotion of the magnetic separation of columnar particles. When the amount of oxygen introduced in FIG. 11 is from 0.6 to 1.2 liters per minute, the easy axis direction of the sample is in the range greater than or equal to 65° and less than or equal to 80° from the line normal to the film. On the other hand, the sample for which oxygen was introduced at a rate of 0.4 liter per minute exhibits an easy axis direction of 93° from the line normal to the film. Similarly, the sample for which oxygen was introduced at a rate of 1.4 liter per minute exhibits an easy axis direction of 58° from the line normal to the film. This indicates the importance of controlling the easy axis direction as a function of the amount of oxygen introduced. In this embodiment, the film deposition rate during the formation of the first magnetic layer was approximately one-third the film deposition rate during the formation of the second magnetic layer. Therefore, in terms of the ratio of (amount of introduced oxygen)/(rate of film deposition), the value during the formation of the first magnetic layer is approximately 1.7 times the value that is observed when the second magnetic layer is formed by introducing oxygen at a rate of 1.6 liters per minute. This indicates the necessity for increasing the ratio of (amount of introduced oxygen)/(rate of film deposition) for the formation of the first magnetic layer. The ratio of (amount of introduced oxygen)/(rate of film deposition) is by no means fixed; it should be adjusted appropriately so that the first magnetic layer is thicker than the second magnetic layer when these magnetic layers are compared. Further, the results in FIG. 11 indicate that the range of the optimum amount of oxygen introduced in order to obtain a high C/N ratio is narrow. This suggests the need for stringent control of the amount of oxygen introduced.

In the next step, the Co—O film as a magnetic layer was formed using the magnetic recording medium fabrication equipment shown in FIG. 8. A polyethylene terephthalate film 7 μm thick was used as substrate 100. The cylindrical drum used, reference numeral 200, had a 1.5 m diameter. (Embodiment 4)

Shielding plates were installed so that the incident angle range for the first magnetic layer was from 85° to 75° and the incident angle range for the second magnetic layer was from 80° to 55°. Cobalt was loaded on evaporation sources 221 and 222. The amount of cobalt loaded on evaporation source 221 was one-third that loaded on evaporation source 222. The power of the electron beam directed on the first evaporation source was 20 kW and 60 kW for the second evaporation source. Oxygen was introduced at a rate of 0.4 liter per minute from oxygen supply nozzle 271 and 1.0 liter per minute from oxygen supply nozzle 272. A film with a magnetic layer total thickness of 0.9 μm was formed by adjusting the running speed of substrate 100.

The sample thus prepared was slit into a tape, its read/write characteristics were examined as in Embodiment 1 and compared with an off-the-shelf ME tape. The results indicate that the tape fabricated in this embodiment outperforms the off-the-shelf ME tape by greater than or equal to +7 dB in playback output and greater than or equal to +6 dB in C/N.

The tape produced in this embodiment exhibits excellent read/write characteristics apparently because of the high magnetic anisotropy energy of the magnetic layer. Therefore, the magnetic anisotropy energy levels of the sample and the comparison tape were examined. The results indicate that whereas the off-the-shelf ME tape has an approximate $K_u$ value of $1.4 \times 10^5$ J/m³, the sample tape has an approximate $K_u$ value of $2.7 \times 10^5$ J/m³. The tape of this embodiment appears to exhibit excellent performance characteristics because of its high energy despite a small film thickness.

(COMPARISON EXAMPLE 1)

A magnetic layer was formed using the same method as in Embodiment 4, except that the range of incident angle for the first magnetic layer was from 90° to 75°. The sample thus prepared was slit into a tape and its read/write characteristics were examined. However, the propensity of the tape surface to become scratched hampered the measurement process. The cause of this problem appears to be the abnormal growth of crystal particles due to the increase in the incident angle to 90°, which made the abnormally grown crystal particles vulnerable to destruction when they slid against the head. The tape's anisotropy energy had a low $K_u$ value of approximately $2.1 \times 10^5$ J/m³.

(COMPARISON EXAMPLE 2)

A magnetic layer was formed using the same method as in Embodiment 4, except that the key-shaped component at the rear edge of shielding plate 260 was removed in order to increase the spacing between the shielding plate and cylindrical drum 200. The sample thus prepared was slit into a tape and its read/write characteristics were examined. Both its playback output and C/N were lower than the tape of Embodiment 4 by 3 to 4 dB. The tape's anisotropy energy had a low $K_u$ value of approximately $1.7 \times 10^5$ J/m³, apparently because of the intrusion of the oxygen introduced for the first magnetic layer into the initially formed side of the second magnetic layer, resulting in a significant decrease in the crystallinity of the second magnetic layer. This suggests the critical importance of adequate control over the amount of oxygen introduced. A structure that permits a fast evacuation of excess oxygen is necessary. The results also suggest that oxygen should be introduced not at the initial stage of film formation but toward the end of it.

Although the above embodiments used a 1.5 m diameter for cylindrical drum 200, other diameter sizes are acceptable. Also, the amount of oxygen introduced is by no means limited to the values used in the embodiments. Substrate 100 can be a film composed of a polymer material other than polyethylene terephthalate. Conditions such as the positions of evaporation sources, incident angle, and film thickness, can be varied as long as they are in the ranges indicated in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium fabrication device for forming a magnetic layer by vapor deposition on a substrate, comprising:

a cooling drum for cooling the substrate at a low temperature to control a growth of the magnetic layer while the substrate is run therearound in a downstream direction;

an evaporation source for depositing the magnetic layer on the substrate;

an ion gun for irradiating ions against the substrate, said ion gun being located just upstream from a plate-like shielding plate defining an initial angle of deposition of said evaporation source with respect to the substrate so as to remove impurities on the substrate prior to the deposition by said evaporation source; and a cooling body for capturing gases struck out from the surface of the substrate by the irradiation of ions by said ion gun, said cooling body being located between said ion gun and an area on the substrate opposite to said ion gun and held at a temperature lower than the temperature of the substrate.

2. The magnetic recording medium fabrication device of claim 1, wherein a part of said cooling body is a pipe and wherein a cooling medium flows in said pipe.

3. The magnetic recording medium fabrication device of claim 1, further comprising a shielding plate arranged between said ion gun and said cooling body.

4. A magnetic recording medium fabrication device for forming magnetic layers on a substrate, comprising:

a cylindrical drum for running the substrate therearound in a downstream direction, first and second evaporation sources for depositing the magnetic layers on the substrate, said first evaporation source being positioned upstream said second evaporation source, and both said first and second evaporation sources being positioned on a same side of a vertically extending plane passing through and including a rotational axis of said cylindrical drum; and shielding plates having first and second openings positioned between said first and second evaporation sources, respectively, and said cylindrical drum;

wherein a horizontal distance between a center of said first evaporation source and said vertically extending plane is greater than a radius of said cylindrical drum;

wherein a horizontal distance between a center of said second evaporation source and said vertically extending plane is less than the radius of said cylindrical drum; and wherein a vertical position of said first opening is higher than that of said second opening.

5. The magnetic recording medium fabrication device of claim 4, wherein said first and second evaporation sources are respectively heated by first and second beams formed by splitting a single beam from an electron beam source.

6. The magnetic recording medium fabrication device of claim 4, wherein said first and second evaporation sources are heated by electron beam irradiation, such that an electron beam directed at either one of said first and second evaporation sources does not intersect with evaporated atoms emitted from either other one of said first and second evaporation sources.

7. The magnetic recording medium fabrication device of claim 4, wherein said first evaporation source is smaller than said second evaporation source.

8. The magnetic recording medium fabrication device of claim 4, further comprising first and second oxygen supply nozzles for introducing oxygen in an upstream direction and located in a vicinity of said shielding plates downstream of said first and second openings, respectively.

* * * * *

UNITED STATES PATENT AND TRADEMARK OFFICE
CERTIFICATE OF CORRECTION

PATENT NO. : 5,679,166
DATED : October 21, 1997
INVENTOR(S) : Kiyokazu TOHMA et al.

It is certified that error appears in the above-indentified patent and that said Letters Patent is hereby corrected as shown below:

On the title page, item [75] Inventors :

Last name of the first inventor is misspelled and should read --Tohma--;

On the cover page, in item [75], "Kiyokazu Thoma" should read --Kiyokazu Tohma--.

Signed and Sealed this

Sixteenth Day of June, 1998

Attest:

BRUCE LEHMAN

*Attesting Officer*  *Commissioner of Patents and Trademarks*